July 14, 1953  J. J. DOONAN  2,645,076
MOWING MACHINE DIVIDER PLATE WITH
DIVIDER ROD ATTACHED THERETO
Filed April 23, 1951
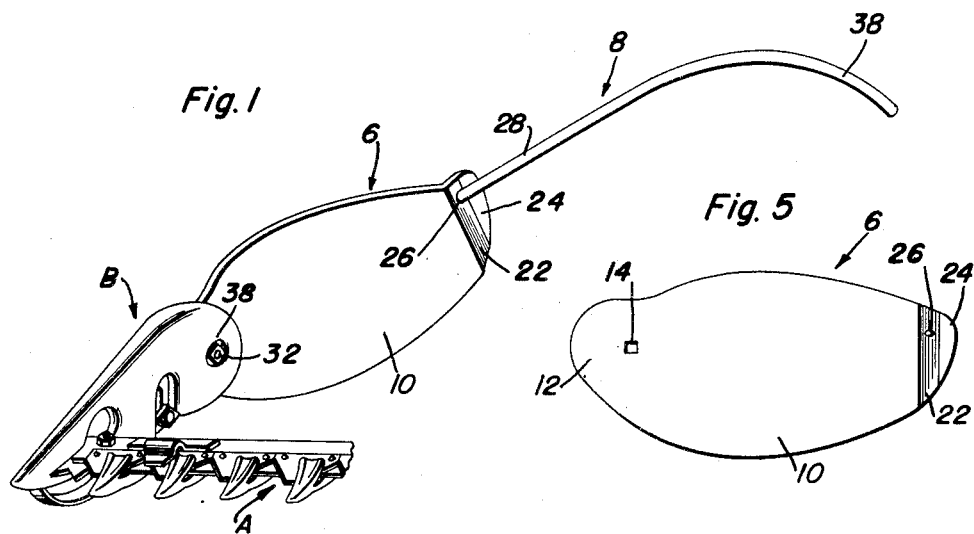
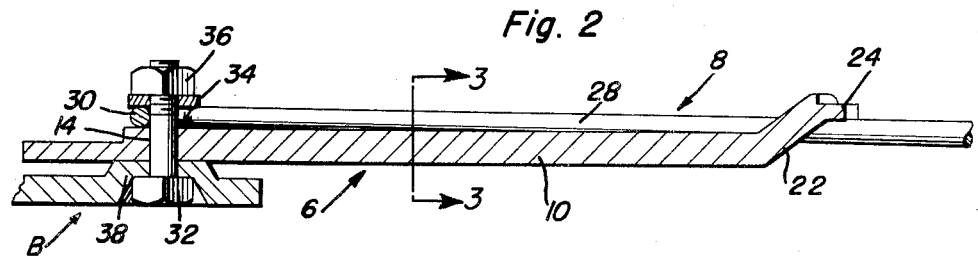
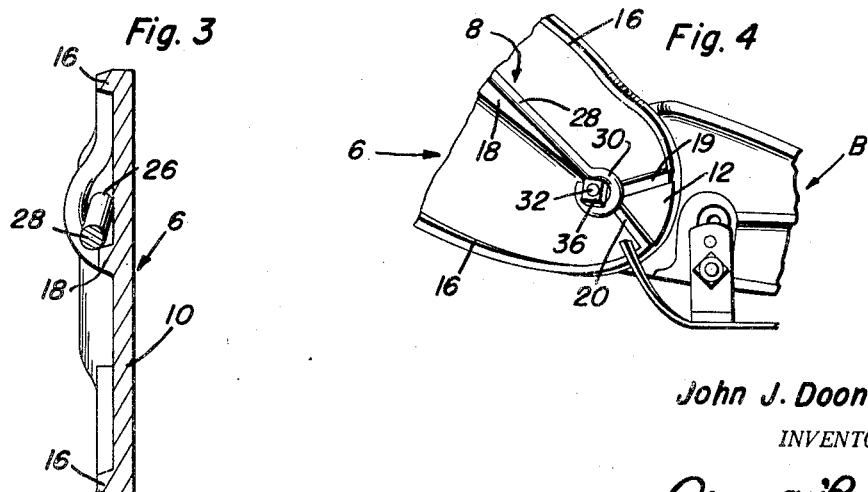
John J. Doonan
INVENTOR.

Patented July 14, 1953

2,645,076

UNITED STATES PATENT OFFICE 2,645,076

MOWING MACHINE DIVIDER PLATE WITH DIVIDER ROD ATTACHED THERETO

John J. Doonan, Brooklyn, Iowa, assignor of one-half to Sylvanus S. Doonan, Brooklyn, Iowa Application April 23, 1951, Serial No. 222,370

2 Claims. (Cl. 56—314)

The present invention relates to certain new and useful improvements in mowing machine divider attachments and has more particular reference to an attachment which is believed to be unique in that it is characterized by two companion components; namely, a rod and a plate which accommodates and supports said rod.

It is a matter of common knowledge that the mowing machine attachments in the specific category under advisement sometimes take the form of a so-called divider "board" which, as a general rule, is most commonly a simple metal shield or plate. In other instances the divider takes the form of a rod or bar which attaches to and projects beyond and follows the trailing end of the usual sickle bar shoe. The latter type of attachment is shown in Patent 1,876,462 of September 6, 1932, and the plate form is shown in Patent 1,846,453 of February 23, 1932.

It is an object of the present invention to structurally, functionally and otherwise improve upon prior patents and any other known divider attachments. To this end, a novelly distinct attachment, a combined plate and rod, is herein revealed, this being a practical and simple adaptation in which manufacturers and users will find their essential requirements and needs fully met, contained and effectually available.

More specifically, the invention has to do with a light-weight reinforced aluminum plate having its inward side, the side which faces the swath, uninterruptedly smooth, the outer side being ribbed and otherwise especially constructed to accommodate a readily attachable and detachable divider rod.

Briefly summarized, the preferred embodiment of the attachment takes the form of a lightweight but sturdy aluminum or equivalent plate which divides the standing grain from the severed grain and a rod combined therewith. The rod is appreciably longer than the plate and has an end and intermediate portion superimposed against and fastened to end portions of the plate with its trailing end projecting well beyond the corresponding end of the plate.

Other objects and advantages will become more readily apparent from the following description and the accompanying sheet of illustrative drawings.

In the accompanying sheet of drawings, wherein like numerals are employed to designate like parts throughout the same:

Figure 1 is a perspective view showing a fragmentary portion of a sickle bar with the customary end-shoe and with the attachment means of this invention applied to said shoe;

Figure 2 is an enlarged view partly in section and partly in elevation detailing the structural aspects of the plate and rod components;

Figure 3 is a cross-section on the line 3—3 of Figure 2, looking in the direction of the arrows;

Figure 4 is a fragmentary elevational view showing the manner in which the forward end of the plate overlaps and is bolted to the trailing end of the shoe; and Figure 5 is a plan view of the plate itself.

Reference is had now to Figure 1 of the drawings wherein the mower or sickle bar construction is denoted as a unit by the reference character A. The reference character B designates the customary end shoe. This, as is well known, is a type of shoe which is utilized on virtually all sickle bar constructions currently in use.

The over-all attachment which is bolted or otherwise fastened on and therefore carried by the shoe B, is a combination assembly which is made up of two components or units; namely, the divider plate 6 on the one hand and a complemental or companion divider rod 8 on the other hand. The plate is marginally shaped so that when it is applied, no part of the same touches or rides on the ground. Therefore, the plate is preferably generally ovate in shape or marginal form. The sickle bar or swath facing side of the plate is perfectly smooth and flat, as denoted at 10. The forward attachable end, which may be the leading end, is provided with a suitable clearance notch as best shown at 12 in Figure 4. This end is also provided with a bolt hole 14, as best shown in Figure 2. The grain facing side of the plate is provided with marginal ribs 16 and a central rib 18 with diverging end portions 19 and 20 (see Figure 4).

The rear or trailing end of the plate is laterally deflected or offset obliquely, as shown, and these offsets define what may be called complemental flanges, the main flange 22 being oblique and the terminal flange 24 in a plane which is parallel with the body portion of the plate. The flange 22 has a rod hole therein, as best shown at 26 in Figure 1. The flange 24 is close to the rod hole and serves as a brace for the rod. It is believed that the particular construction of the plate component 6 is now clear. The rod component is denoted at 8 and this comprises a cylindrical rod which has a linearly straight attaching shank 28 which is superimposed against the ribbed side of the plate. The shank terminates in an assembling eye 30 which, as shown in Figure 2, serves to accommodate the shank of the bolt 32, a washer 34 and an assembling and clamping nut 36. The intermediate portion of the rod, specifically the shank 28, extends through the aperture or hole 26 in the flange 22 and rests firmly against the back-up flange 24. The terminal end of the rod is of curvate form, as denoted at 38 and this curvate end is positioned well beyond the flanged trailing end of the plate unit. The same bolt 32 which assembles the plate and rod also mounts these assembled parts on the trailing end portion of the sickle bar shoe B. Referring to Figure 2, it will be noticed that the shoe has means, which is customary, to accommodate the bolt, said means being denoted at 38.

As disclosed in the introductory portion of the description, many and varied styles and forms of divider boards have been evolved and produced by others. In some instances, instead of using plates and shields for the purpose these, because of their flat area extent, some have advocated the use of elongated bars and rods. As a matter of fact, certain combination plates and short grain deflecting limbs and rods have been offered. The instant invention has to do, as is obvious, with a special smooth flat surfaced ovate plate which clears the ground when in use and has properly angled flange means at its trailing end, with one flange apertured to accommodate a coacting portion of the shank of a rod and the other flange serving as a backing and reinforcing element for the rod. The opposite end of the rod is provided with an eye and a single bolt serves to penetrate the leading end of the plate, the eye and also functions to not only bind these parts together but to bolt them in position on the trailing end of the sickle bar shoe. These refinements and improvements in the combination divider plate and rod represent the contributions distinguishing the subject matter of the instant presentation.

It is thought that persons skilled in the art to which the invention relates will be able to obtain a clear understanding of the invention after considering the description in connection with the drawings. Therefore, a more lengthy description is regarded as unnecessary.

Minor changes in shape, size and arrangement of details coming within the field of invention claimed may be resorted to in actual practice, if desired.

Having described the invention, what is claimed as new is:

1. An attachment of the class described comprising an elongated flat surfaced divider plate having a smooth swath facing surface on one side and having a plurality of coacting reinforcing ribs on the other side, said plate being approximately ovate in marginal configuration and being provided at its leading end with a bolt hole and provided at its opposite trailing end with laterally offset flange means, the latter having a rod opening, a rod having one end portion and the adjacent intermediate portion superimposed against the ribbed side of said plate and terminating in an eye, said eye being in registration with said bolt hole, the intermediate portion of said rod passing through the opening in said flange means and the trailing end of said rod projecting well beyond said flange means, and a bolt passing through said bolt hole and through said eye and provided with a clamping and assembling nut cooperable with said eye.

2. An attachment of the class described comprising an elongated substantially ovate divider plate having a smooth flat swath facing surface on one side and rib means on the opposite side, provided at its leading end with a bolt hole and provided at its opposite trailing end with an obliquely disposed main flange and a complemental terminal flange, said terminal flange being disposed in a plane substantially parallel with the ribbed side of said plate and being provided with a rod opening, a rod having an end and an intermediate portion superimposed against the ribbed side of said plate, said rod terminating in an eye and said eye being in registration with said bolt hole, the intermediate portion of the rod passing through the rod opening in said terminal flange and the trailing end of said rod being curvate and projecting well beyond said flanges, and a bolt passing through said bolt hole and said eye and provided with a clamping and assembling nut.

JOHN J. DOONAN.

References Cited in the file of this patent

UNITED STATES PATENTS

| Number | Name | Date |
|---|---|---|
| 398,853 | Smith | Mar. 5, 1889 |
| 925,863 | Braun | June 22, 1909 |
| 1,490,151 | Wheaton | Apr. 15, 1924 |
| 1,792,607 | Rivington | Feb. 17, 1931 |
| 1,876,462 | Larson | Sept. 6, 1932 |
| 2,203,418 | Mills | June 4, 1940 |